United States Patent Office 3,254,121
Patented May 31, 1966

3,254,121
BROMINATION OF SALICYLANILIDE
Theodore E. Majewski, Midland, Mich., assignor to The Dow Chemical Company, Midland, Mich., a corporation of Delaware
No Drawing. Filed Aug. 4, 1964, Ser. No. 387,474
6 Claims. (Cl. 260—559)

This invention relates to a novel process for the bromination of salicylanilide. More particularly, this invention relates to the bromination of salicylanilide in a reaction medium of p-dioxane and water to produce a product mixture low in 4′,5-dibromosalicylanilide content.

This is a continuation-in-part of my co-pending application Serial Number 177,257, filed March 5, 1962, now U.S. Patent 3,152,177.

Whereas it is generally believed that 4′,5-dibromosalicylanilide has a low oral toxicity, it is also believed to sensitize skin to ultraviolet light. Thus, when brominated salicylanilides are to be applied to the skin, such as in bacteriostatic formulations, it is necessary that the 4′,5-dibromosalicylanilide content thereof be held to a minimum, preferably not in excess of one percent by weight of brominated salicylanilide.

A number of methods have been proposed for the bromination of salicylanilide. Some common methods include bromination in water, alcohol and mixtures thereof. None of these methods is satisfactory to produce a product mixture sufficiently low in 4′,5-dibromosalicylanilide.

I have discovered a method of brominating salicylanilide to obtain a product containing predominantly 3,4′,5-tribromosalicylanilide and less than 1 percent by weight of 4′,5-dibromosalicylanilide.

In accordance with the presently disclosed and claimed method, salicylanilide is brominated in a reaction mixture consisting essentially of from 35 to 80 weight percent p-dioxane and from 65 to 20 weight percent water, and preferably from 40 to 75 percent p-dioxane and from 60 to 25 weight percent water.

The usual bromination technique followed in accordance with the present invention is to dissolve, suspend or slurry the salicylanilide with the reaction medium and add bromine thereto to form a reaction mixture. The reaction mixture is then subjected to a temperature ordinarily within the range of from about 35 to about 85 degrees centigrade and maintained within this temperature range throughout the reaction period. Usually, substantially complete reaction is achieved with a reaction period of from about one hour or less to about four hours. Optionally, the reaction mixture may be allowed to stand at room temperature for a period of time prior to heating. At the end of the reaction period, the mixture is cooled and the product mixture of brominated salicylanilide is removed from the reaction medium as by filtering, centrifuging, or the like. The product may then be washed and dried if desired.

Reactants are operably present in a ratio of from about two and one-half to about three and one-half moles of bromine per mole of salicylanilide, with a mole ratio (bromine to salicylanilide) of about 3:1 being preferred.

Generally, enough reaction medium is employed so as to form a suspension or slurry with the starting salicylanilide material. Ordinarily from about one to about five volumes of reaction medium per unit volume of total reactant material is used.

Product obtained by the present method contains 3,4′,5-tribromosalicylanilide as the predominatnt constituent. Unexpectedly, the 4′,5-dibromosalicylanilide isomer is less than one weight percent of the brominated product. The product of the present process is well known to have bacteriostatic properties and, for example, may be incorporated in soaps, detergents, or the like.

This process may be better understood in light of the following examples which are set forth to illustrate, and are not to be construed to limit, the present invention.

Example 1

A liquid slurry was prepared by mixing 85.4 grams of salicylanilide in 400 grams of 50 percent p-dioxane–50 percent water reaction medidum. While holding the slurry temperature between 40–45 degrees centigrade, 191.8 grams of bromine were added thereto. After addition of bromine was completed, the reaction mixture thus formed was heated to 80–85 degrees centigrade and held in that temperature range for about one hour. After reaction, the mixture was cooled to 25 degrees centigrade and filtered to separate brominated product from the reaction medium. The product was washed twice with 100 milliliter portions of a 50–50 p-dioxane-water mixture, and twice with 100 milliliter portions of water. After drying, 172.9 grams (96 percent yield) of brominated product was obtained having the following analysis:

| | Percent |
|---|---|
| 3,4′,5-tribromosalicylanilide | 97.0 |
| 3,5-dibromosalicylanilide | 2.76 |
| 4′,5-dibromosalicylanilide | 0.24 |

Example 2

Employing substantially the method of Example 1, but brominating at different temperatures, the following products were obtained:

| | Bromination Temperature, °C. | Yield (percent) | Product |
|---|---|---|---|
| A | 60–65 | 96.7 | 3,4′,5-tribromosalicylanilide 97.0%. 3,5-dibromosalicylanilide 2.79%. 4′,5-dibromosalicylanilide 0.21%. |
| B | 75–80 | 94.7 | 3,4′,5-tribromosalicylanilide 94.0%. 3,5-dibromosalicylanilide 4.91%. 4′,5-dibromosalicylanilide 0.09%. |

Example 3

Employing substantially the method of Example 1, but using a reaction medium containing 60 percent p-dioxane and 40 percent water to brominate salicylanilide at 80–85 degrees centigrade, 166.2 grams (92.3% yield) of product was obtained which had the following analysis:

| | Percent |
|---|---|
| 3,4′,5-tribromosalicylanilide | 96.0 |
| 3,5-dibromosalicylanilide | 3.88 |
| 4′,5-dibromosalicylanilide | 0.12 |

Example 4

Employing substantially the method of Example 1, but using a reaction medium containing 75 percent p-dioxane and 25 percent water to brominate at 80–85 degrees centigrade, 155.9 grams (86.8% yield) of product was obtained which had the following analysis:

| | Percent |
|---|---|
| 3,4′,5-tribromosalicylanilide | 98.0 |
| 3,5-dibromosalicylanilide | 1.78 |
| 4′,5-dibromosalicylanilide | 0.22 |

Example 5

Employing substantially the method of Example 1, but using a reaction medium containing 40 percent p-dioxane and 60 percent water, 171.3 grams (95% yield) of product was obtained having the following analysis:

| | Percent |
|---|---|
| 3,4',5-tribromosalicylanilide | 95.0 |
| 3,5-dibromosalicylanilide | 4.12 |
| 4',5-dibromosalicylanilide | 0.88 |

Example 6 (comparative)

Using substantially the method of Example 1, runs were made employing reaction media containing 30 percent p-dioxane–70 percent water, and 85 percent p-dioxane–15 percent water. Results are tabulated below:

| Reaction Medium | Product |
|---|---|
| 30% p-dioxane–70% water | 3,4',5-tribromosalicylanilide 92.0%. 3,5-dibromosalicylanilide 6.56%. 4',5-dibromosalicylanilide 1.44%. |
| 85% p-dioxane–15% water | 3,4',5-tribromosalicylanilide 98.0%. 3,5-dibromosalicylanilide <1%. 4',5-dibromosalicylanilide 1.71%. |

Various modifications may be made in the present invention without departing from the spirit or scope thereof, and it is to be understood that I limit myself only as defined in the appended claims.

I claim:

1. In a method of producing a bromination product comprising predominantly 3,4',5-tribromosalicylanilide which includes the steps of reacting salicylanilide with bromine in a reaction medium, the improvement which comprises the steps of effecting the reaction with from about 2½ to about 3½ molecular proportions of bromine per molecular proportion of salicylanilide in a reaction medium consisting essentially of from 35 to 80 percent p-dioxane and correspondingly from 65 to 20 percent water, and thereafter separating as the bromination product a mixture containing predominantly 3,4',5-tribromosalicylanilide and not greater than 1 percent by weight of 4',5-dibromosalicylanilide.

2. In a method of producing a bromination product comprising predominantly 3,4',5-tribromosalicylanilide which includes the steps of reacting salicylanilide with bromine in a reaction medium, the improvement which comprises the steps of effecting the reaction with from about 2½ to about 3½ molecular proportions of bromine per molecular proportion of salicylanilide in a reaction medium consisting essentially of from 40 to 75 weight percent p-dioxane and correspondingly from 60 to 25 weight percent water and thereafter separating as the bromination product a mixture containing predominantly 3,4',5-tribromosalicylanilide and not greater than 1 percent by weight of 4',5-dibromosalicylanilide.

3. In a method of producing a bromination product comprising predominantly 3,4',5-tribromosalicylanilide which includes the steps of reacting salicylanilide with bromine in a reaction medium, the improvement which comprises the steps of effecting the reaction with from about 2½ to about 3½ molecular proportions of bromine per molecular proportion of salicylanilide in a reaction medium consisting essentially of 50 weight percent p-dioxane and 50 weight percent water and thereafter separating as the bromination product a mixture containing predominantly 3,4',5-tribromosalicylanilide and not greater than 1 precent by weight of 4',5-dibromosalicylanilide.

4. In a method of producing a bromination product comprising predominantly 3,4',5-tribromosalicylanilide which includes the steps of reacting salicylanilide with bromine in a reaction medium, the improvement which comprises the steps of effecting the reaction with from about 2½ to about 3½ molecular proportions of bromine per molecular proportion of salicylanilide in a reaction medium consisting essentially of 60 weight percent p-dioxane and 40 weight percent water and thereafter separating as the bromination product a mixture containing predominantly 3,4',5 - tribromosalicylanilide and not greater than 1 percent by weight of 4',5-dibromosalicylanilide.

5. In a method of producing a bromination product comprising predominantly 3,4',5-tribromosalicylanilide which includes the steps of reacting salicylanilide with bromine in a reaction medium, the improvement which comprises the steps of effecting the reaction with from about 2½ to about 3½ molecular proportions of bromine per molecular proportion of salicylanilide in a reaction medium consisting essentially of 75 weight percent p-dioxane and 25 weight percent water and thereafter separating as the bromination product a mixture containing predominantly 3,4',5-tribromosalicylanilide and not greater than 1 percent by weight of 4',5-dibromosalicylanilide.

6. In a method of producing a bromination product comprising predominantly 3,4',5-tribromosalicylanilide which includes the steps of reacting salicylanilide with bromine in a reaction medium, the improvement which comprises the steps of effecting the reaction with from about 2½ to about 3½ molecular proportions of bromine per molecular proportion of salicylanilide in a reaction medium consisting essentially of 40 weight percent p-dioxane and 60 weight percent water and thereafter separating as the bromination product a mixture containing predominantly 3,4',5-tribromosalicylanilide and not greater than 1 percent by weight of 4',5-dibromosalicylanilide.

References Cited by the Examiner

UNITED STATES PATENTS

| 2,997,502 | 8/1961 | Mattson | 260—559 |
| 3,057,920 | 10/1962 | Schramm | 260—559 |
| 3,152,177 | 10/1964 | Majewski | 260—559 |

OTHER REFERENCES

Conant et al.: The Chemistry of Organic Compounds, pages 344–347, New York, Macmillan, 1939.

WALTER A. MODANCE, *Primary Examiner.*

NATALIE TROUSOF, *Assistant Examiner.*